(12) United States Patent
Hahn et al.

(10) Patent No.: US 10,841,302 B2
(45) Date of Patent: Nov. 17, 2020

(54) METHOD AND APPARATUS FOR AUTHENTICATING UE BETWEEN HETEROGENEOUS NETWORKS IN WIRELESS COMMUNICATION SYSTEM

(71) Applicant: LG ELECTRONICS INC., Seoul (KR)

(72) Inventors: Genebeck Hahn, Seoul (KR); Jiwon Kang, Seoul (KR); Heejin Kim, Seoul (KR); Ilmu Byun, Seoul (KR); Hyunjin Shim, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 15/604,547

(22) Filed: May 24, 2017

(65) Prior Publication Data

US 2018/0343249 A1 Nov. 29, 2018

(51) Int. Cl.
*H04W 12/06* (2009.01)
*H04W 88/02* (2009.01)
*H04W 12/04* (2009.01)
*H04L 29/06* (2006.01)
*H04W 12/00* (2009.01)

(52) U.S. Cl.
CPC ......... *H04L 63/0869* (2013.01); *H04W 12/06* (2013.01); *H04L 63/06* (2013.01); *H04L 63/0876* (2013.01); *H04W 12/009* (2019.01); *H04W 12/00512* (2019.01); *H04W 12/0401* (2019.01); *H04W 12/0403* (2019.01); *H04W 88/02* (2013.01)

(58) Field of Classification Search
CPC . H04L 63/0869; H04L 63/0428; H04L 63/06; H04L 63/0876; H04L 63/10; H04W 88/02
USPC .............................................................. 726/7
See application file for complete search history.

(56) References Cited

U.S. PATENT DOCUMENTS

| | | | |
|---|---|---|---|
| 8,275,988 B2 * | 9/2012 | Fischer | H04L 63/123 455/410 |
| 2008/0212771 A1 * | 9/2008 | Hauser | G06F 21/305 380/44 |
| 2010/0228967 A1 * | 9/2010 | Hahn | H04W 12/06 713/155 |

(Continued)

*Primary Examiner* — Alexander Lagor
*Assistant Examiner* — Moeen Khan
(74) *Attorney, Agent, or Firm* — Lee Hong Degerman Kang Waimey

(57) ABSTRACT

A method for performing a security procedure by a terminal in a wireless communication system, and an apparatus thereof. The method includes transmitting a first access request message for accessing a first network of a core network to a first radio access network (RAN) node, performing an authentication procedure for mutual authentication with a node performing an authentication server function (AUSF) of the core network, generating a common key commonly used in one or more networks included in the core network based on an authentication vector obtained through the mutual authentication procedure, generating a first base key of the first network based on the common key and a network code corresponding to a type of the first network, and receiving an access accept message indicating an access accept of the first network from the first RAN node.

16 Claims, 9 Drawing Sheets

(56) References Cited

U.S. PATENT DOCUMENTS

| | | | |
|---|---|---|---|
| 2011/0158162 A1* | 6/2011 | Mizikovsky | H04L 63/20 370/328 |
| 2016/0255064 A1* | 9/2016 | Naslund | G06F 21/602 726/3 |
| 2016/0255458 A1* | 9/2016 | Huang | H04W 4/70 370/338 |
| 2017/0187691 A1* | 6/2017 | Lee | H04W 4/70 |
| 2017/0272945 A1* | 9/2017 | Link, II | H04W 4/70 |
| 2017/0318450 A1* | 11/2017 | Salkintzis | H04W 8/02 |
| 2018/0007552 A1* | 1/2018 | Bae | H04L 63/06 |
| 2018/0242147 A1* | 8/2018 | Fransen | H04W 12/04 |

* cited by examiner

[Fig.1]
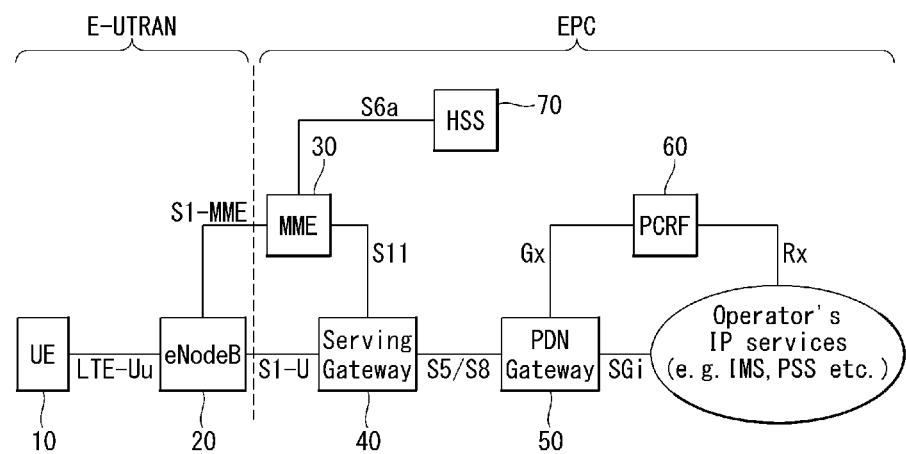

[Fig.2]
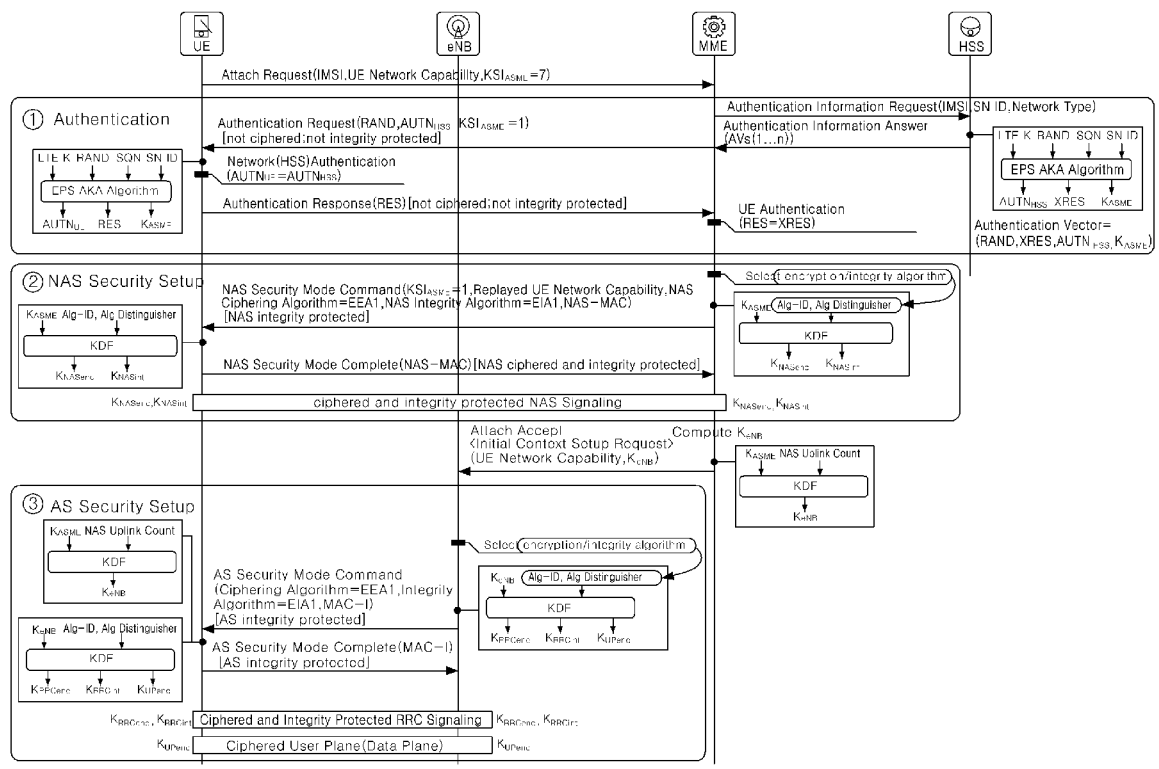

[Fig.3]
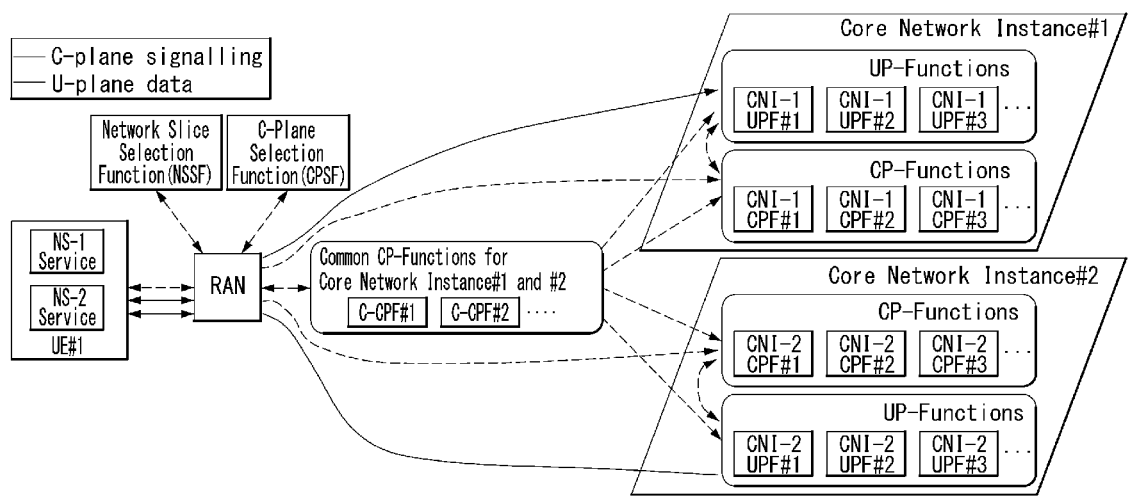

[Fig.4]
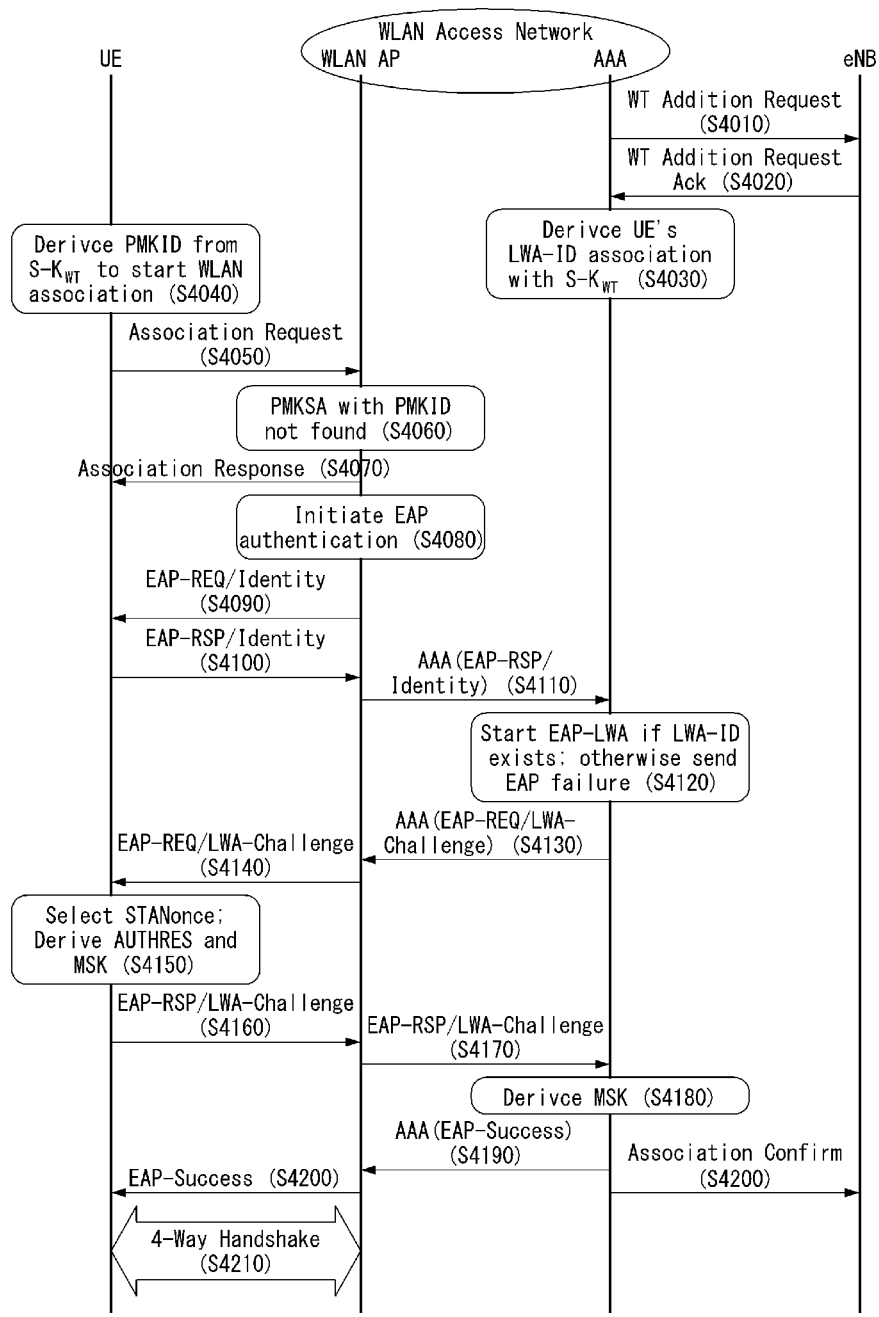

[Fig.5]
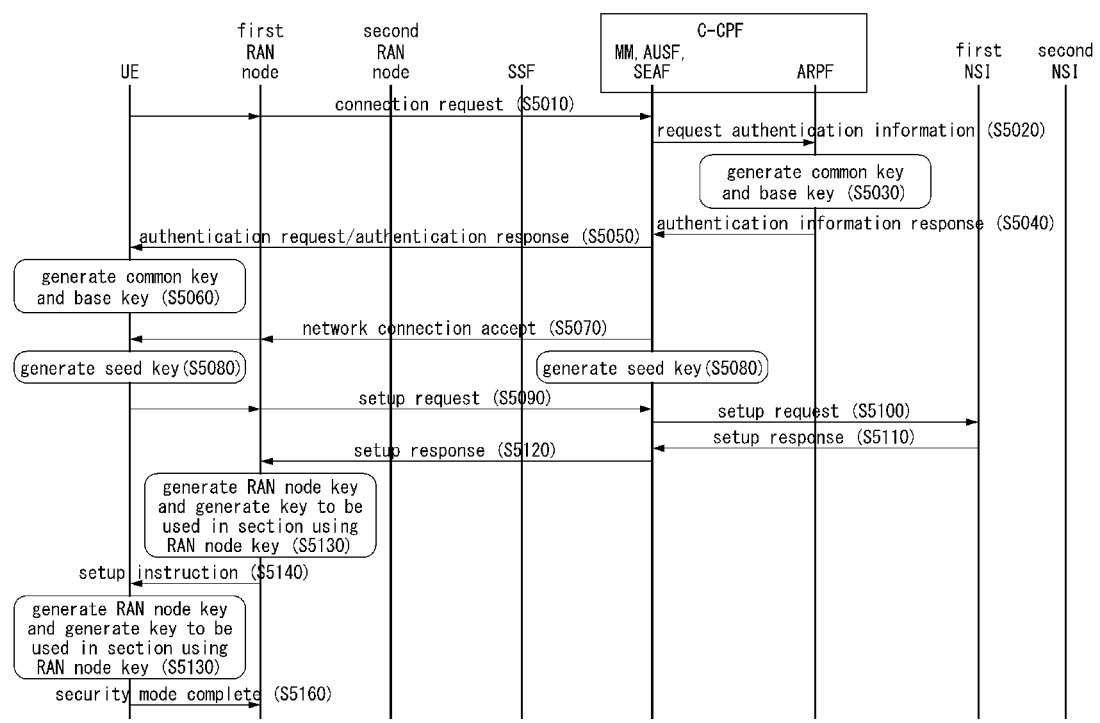

[Fig.6]
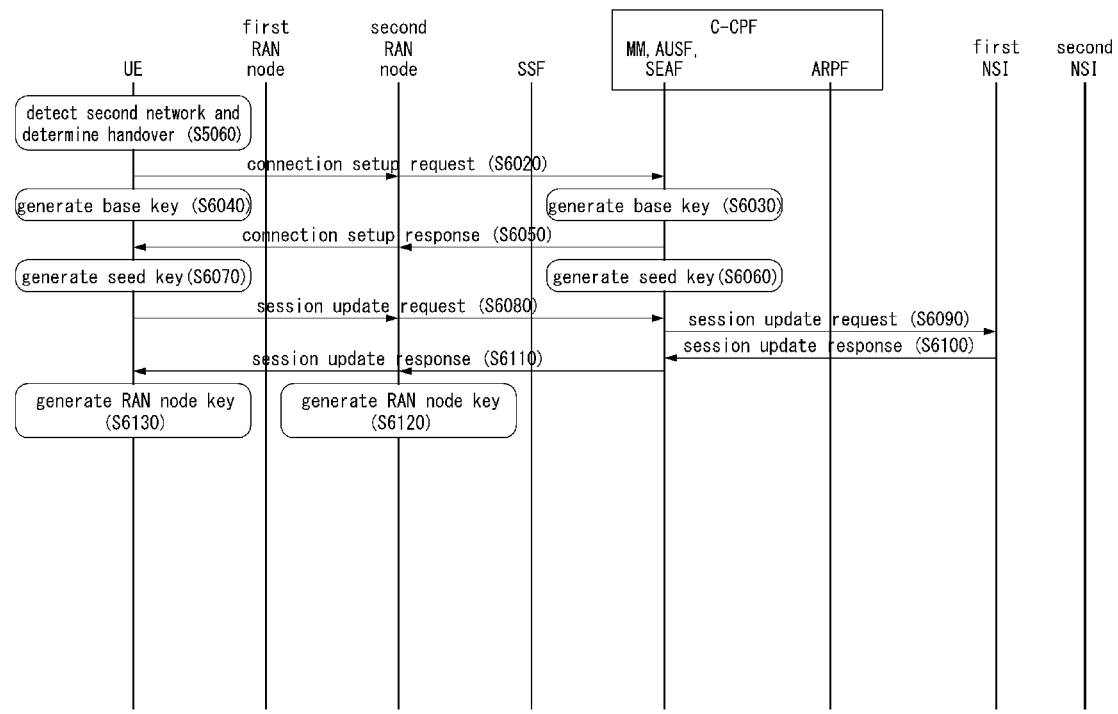

[Fig.7]
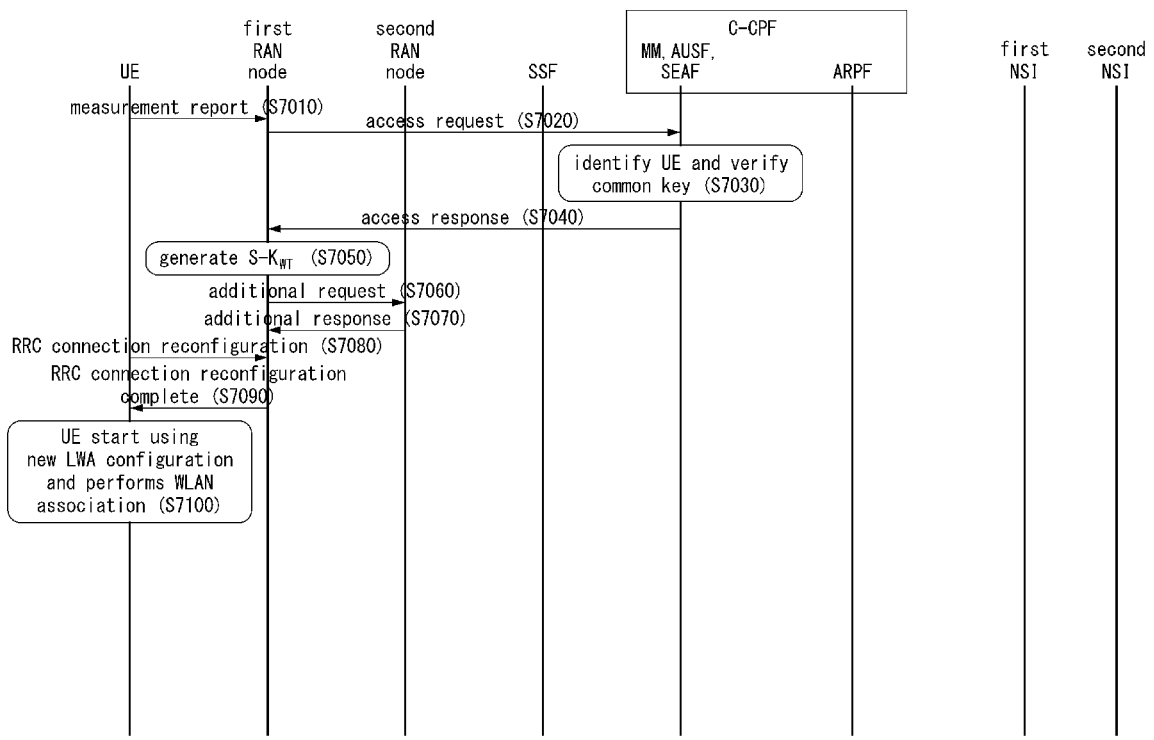

[Fig.8]
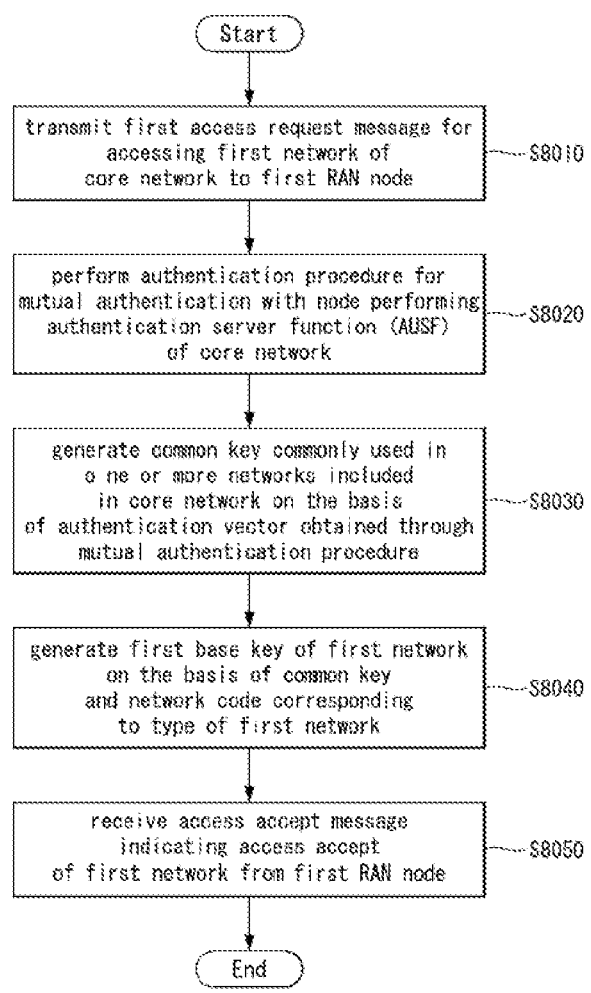

[Fig.9]
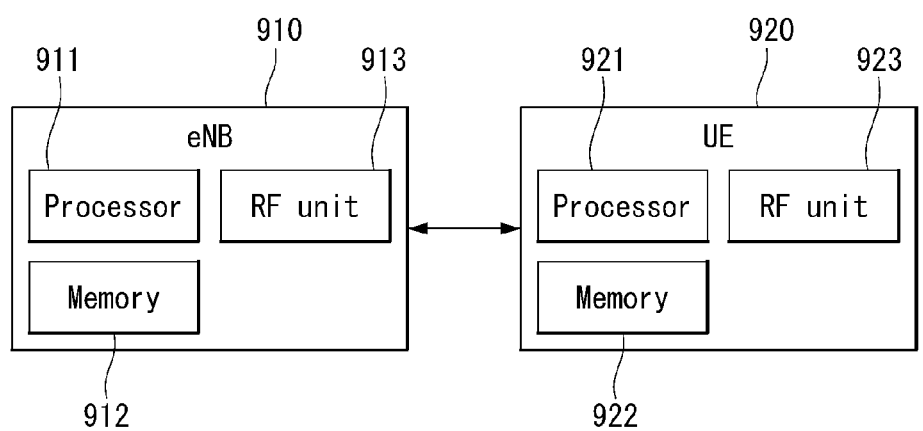

METHOD AND APPARATUS FOR AUTHENTICATING UE BETWEEN HETEROGENEOUS NETWORKS IN WIRELESS COMMUNICATION SYSTEM

BACKGROUND OF THE INVENTION

Field of the Invention

The present disclosure relates to a wireless communication system and, more particularly, to a method and apparatus for authenticating a user equipment (UE) in an individual network through UE authentication between the UE and a core network.

Discussion of the Related Art

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

Also, compared with security features evolved up to the specifications in the 4G mobile communication system, the security features expected to be added to the 5G mobile communication system may be described as follows.

The 5G mobile communication system has to accommodate a new type of service delivery model such as network slicing. Network slicing refers to providing a virtual isolated sub-network optimized for service characteristics and aims to provide optimized services for individual applications since requirements differ from application to application.

Accordingly, security architecture also needs to be very flexible according to service characteristics of each network slice, which indicates that the 5G mobile communication network has to be designed to reduce security-related overhead to accommodate network slicing.

The 5G mobile communication system has to be designed not only to provide new functions but also to accommodate new verticals (industries).

This aims to accommodate a new business model about how the mobile communication network and communication should be provided.

In other words, it indicates that a new trust model which takes into account various types of devices (for example, unattended machines, sensors, wearable devices, and vehicles) with security requirements different from each other and some important sectors (for example, public safety and eHealth) has to be defined.

The 5G mobile communication system has to provide optimized Multi-Radio Access Technology (Multi-RAT) operation. This feature is aimed to reduce OTA signaling and delay required to perform authentication or security setup for Multi-RAT access having a different security mechanism from each other.

In other words, in the existing 4G and previous standards, when connecting to a different RAT, separate authentication and security setting have been performed on a user equipment due to different authentication methods and security setup mechanisms such as key handling even if the user equipment accesses the same core network.

However, the 5G security specification requires that effective Multi-RAT security architecture capable of reducing such redundancy should be provided.

Meanwhile, one of the issues being discussed recently related to the 5G network architecture is to adopt a network slicing concept for the 5G new core network.

In addition, one of the architectural principles of the 5G core network states that a user equipment attaches to a network without setting a session for data transmission, network slices are isolated/separated from each other, and a core network instance (for example, a network slice) is dedicated to terminals of the same type.

The aforementioned statement originates from the fact that the 5G core network is expected to evolve to implement service-oriented architecture, and a fixed, single type of network architecture will not be able to satisfy various service requirements.

In other words, it is not cost-effective to accommodate all the services expected to be provided by the 5G network in a single, fixed network architecture. Therefore, a consensus is formed that network architecture based on a physically fixed structure is divided logically into network slices to accommodate various service requirements.

SUMMARY OF THE INVENTION

An aspect of the present disclosure provides a method and apparatus for enabling a user equipment (UE) to access another network included in a core network without a re-authentication procedure, if the UE once initially performs an authentication procedure with a network included in the same core network in a next-generation system (e.g., a 5G system).

Another aspect of the present disclosure provides a method and apparatus for generating a security key of each of networks included in the same core network through a single common security key.

Another aspect of the present disclosure provides a method and apparatus for performing handover to another network included in the same core network through a common security key or performing association with another network to provide a service.

The technical problems of the present invention are not limited to the above-described technical problems and the other technical problems will be understood by those skilled in the art from the following description.

According to an aspect of the present disclosure, a method and apparatus for authenticating a UE between heterogeneous networks.

In detail, a method for authenticating a terminal between heterogeneous networks according to an embodiment of the present invention, includes: transmitting a first access request message for accessing a first network of a core network to a first radio access network (RAN) node, the first access request message including a terminal identifier for identifying the terminal; performing an authentication procedure for mutual authentication with a node performing an authentication server function (AUSF) of the core network; generating a common key commonly used in one or more networks included in the core network based on an authentication vector obtained through the mutual authentication procedure; generating a first base key of the first network based on the common key and a network code corresponding to a type of the first network; and receiving an access accept message indicating an access accept of the first network from the first RAN node, wherein the network code is obtained through the authentication procedure.

The method may further include: generating a first seed key for generating a security key used in the first network based on the first base key; transmitting to the first RAN node a session establishment request message requesting a session setup of the first network, wherein the session establishment request message includes the first seed key and the security capability information of the terminal; and receiving a security mode setup response message in response to the session setup request message, wherein the security mode setup response message includes security setup information related to security to be applied to the terminal by a first network node of the first network based on the security capability information and a first network identifier for identifying the first network.

The method may further include: transmitting a second access request message requesting an access to a second network of the core network, to a second RAN node; generating a second base key of the second network based on the common key; generating a second seed key for generating a security key used in the second network based on the first base key and a second network identifier for identifying the second network; performing a session path updating procedure for verifying validity of the second seed key with a third network node performing a security anchor function of the core network or a fourth network node performing a security context management function of the core network; and generating a second RAN node key for generating a security key used in a radio section with the second RAN node based on the second seed key and a second RAN node identifier for identifying the second RAN node.

According to another aspect of the present disclosure, a terminal includes: a communication unit transmitting and receiving a wireless signal to and from the outside; and a processor functionally coupled to the communication unit, wherein the processor transmits a first access request message for accessing a first network of a core network to a first radio access network (RAN) node, the first access request message including a terminal identifier for identifying the terminal, performs an authentication procedure for mutual authentication with a node performing an authentication server function (AUSF) of the core network, generates a common key commonly used in one or more networks included in the core network based on an authentication vector obtained through the mutual authentication procedure, generates a first base key of the first network based on the common key and a network code corresponding to a type of the first network, and receives an access accept message indicating an access accept of the first network from the first RAN node, wherein the network code is obtained through the authentication procedure.

According to embodiments of the present invention, since a UE is authenticated by a network node (e.g., an AUSF) having an authentication server function through an authentication procedure at an initial access, the UE may access another network without a re-authentication procedure.

Also, the UE may generate a security key of each network through a common key generated when the UE is initially authenticated with respect to a network.

Thus, when the UE performs handover to another network or performs an LWA (LTW-WLAN aggregation), the UE may perform handover or the LWA operation without separate re-authentication.

In addition, since the UE may perform handover or an LWA operation without re-authentication, delay of security signaling or overhead may be reduced.

The effect of the present invention is not limited to the above-described effects and the other objects will be understood by those skilled in the art from the following description.

BRIEF DESCRIPTION OF DRAWINGS

The above and other aspects, features, and advantages of the present disclosure will be more clearly understood from the following detailed description taken in conjunction with the accompanying drawings, in which:

FIG. 1 illustrates one example of an EPS (Evolved Packet System) related to the LTE system to which technical features of the present invention may be applied.

FIG. 2 illustrates a security setting method which takes into account the whole network defined in the LTE(-A) system.

FIG. 3 illustrates sharing a set of common C-plane functions among a plurality of core network instances to which a method according to the present invention may be applied.

FIG. 4 is a flow chart illustrating an example of an LTE-WLAN aggregation (LWA) operation method to which a method of the present disclosure may be applied.

FIG. 5 is a flow chart illustrating an example of a method for generating a common key which may be used in multiple networks in an initial network access procedure proposed in this disclosure.

FIG. 6 is a flow chart illustrating an example of a method for performing a handover procedure through a generated common key proposed in this disclosure.

FIG. 7 is a flow chart illustrating an example of a method for performing an LWA operation through a generated common key proposed in this disclosure.

FIG. 8 is a flow chart illustrating an example of a method for generating a common key which may be used in multiple networks by a terminal in an initial network access procedure proposed in this disclosure.

FIG. 9 is a block diagram of a wireless communication device to which methods proposed in this disclosure may be applied.

DETAILED DESCRIPTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

Embodiments of the present invention may be supported by standard documents disclosed for at least one of the IEEE 802, 3GPP, and 3GPP2 wireless access systems. In other words, among the embodiments of the present invention, those steps or parts not described for the purpose of clarifying the technical principles of the present invention may be supported by the documents. Also, all of the terms disclosed in the present invention may be described by the standard documents.

To clarify the description of the present invention, the 5G system is mainly dealt with. However, the technical features of the present invention is not limited to the specific system, but may be equally applied to the 3GPP LTE/LTE-A system.

In what follows, before describing the present invention with reference to appended drawings, terms used in the present document are defined briefly for the understanding of the present invention.

APN (Access Point Name): a name of an access point managed by a network, which is provided to a UE. In other words, it indicates the name (character string) of a PDN. On the basis of the name of the access point, the corresponding PDN for transmitting and receiving data is determined.

MME: short for Mobility Management Entity, which is responsible for controlling each entity within an EPS to provide a session and mobility for a UE.

Session: a passage for data transmission. PDN, Bearer, IP flow unit, and so on may be used as a session unit.

As defined in the 3GPP specification, each unit may be distinguished by its application range: a unit for describing the whole network (APN or PDN scale), a unit for describing QoS within the network (Bearer scale), and a destination IP address unit.

TIN: Temporary Identify used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, a UE identifier known to the MME.

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

FIG. 2 illustrates a security setting method which takes into account the whole network defined in the LTE(-A) system.

With reference to FIG. 2, the current LTE/LTE-A system performs authentication simultaneously with connection to an MME of a core network regardless of the service provided to the UE, and as a result of the authentication, sets up a NAS/AS key, and performs communication to receive a service.

However, a 3GPP access network connected to a core network in a next-generation communication system (e.g., 5G) is a new RAT and an eLTE, and, unlike the existing technique, a non-3GPP access network such as a WLAN, or the like, is expected to be directly connected to an 5G NGC.

That is, in the aspect of a structure of a core network, in the related art, authentication entities are different in relation to the 3GPP access technique and the non-3GPP access technique (e.g., an authentication entity for 3GPP access is an MME and an authentication entity for WLAN access is an AAA server), and thus, in cases where the same UE has two connections using different access techniques, separate authentication procedures should be respectively performed for the accesses.

This increases delay for security association between the UE and the network and causes overhead for signaling transmission.

Thus, in order to solve such a problem, the present invention proposes a method for allowing a UE to access another network without a separate re-authentication procedure, if the UE is once authenticated with respect to a network through an initial network access procedure.

FIG. 3 illustrates sharing a set of common C-plane functions among a plurality of core network instances to which a method according to the present invention may be applied.

An 5G network architecture is expected to be configured to accommodate a network slicing concept in a core network.

FIG. 3 illustrates an example of such an architecture, and a UE is connected to CNIs for an actual service through common CPFs.

FIG. 4 is a flow chart illustrating an example of an LTE-WLAN aggregation (LWA) operation method to which a method of the present disclosure may be applied.

FIG. 4 illustrates an example of an LWA operation for a UE in an RRC connected state supported by an E-UTRAN in the conventional 4G network and a WLAN association/authentication procedure.

When eNB wants to start LWA for the UE, it sends WT Addition Request to the WT (S4010). This request includes the UE MAC address and the S-KWT.

WT acknowledges the receipt of WT Addition request (S4020).

WT sets LWA-ID to SHA256 (S-KWT, UE MAC addr, "LWA Identity") and associates with the received S-KWT (S4030).

After receiving command from eNB to start LWA and deriving S-KWT, the UE derives PMKID (S4040).

UE includes the PMKID in the WLAN Association Request (S4050).

The PMKSA associated with PMKID is not found at the WLAN AP (S4060).

The WLAN AP responds with WLAN Association Response, omitting the PMKID that is not found at the AP (S4070).

WLAN AP initiates EAP authentication (S4080).

WLAN AP sends EAP-Identity Request message (S4090).

The UE responds with EAP-Identity Response message with the LWA-ID@realm as the UE identity for EAP-LWA. The LWA-ID and realm are set as follows (S4100):

LWA-ID=SHA256 (S-KWT, UE MAC addr, "LWA Identity");

realm=lwa.wtid<WTID>.mnc<MNC>.mcc<MCC>.3gppnetwork.org;

WTID=E-UTRAN Cell Identity (ECI) of eNB;

MNC=MNC of Serving Network PLMN Identity;

MCC=MCC of Serving Network PLMN Identity.

WLAN AP uses the realm and routes the EAP-Identity response to WT as AAA message (S4110).

WT uses LWA-ID to locate the S-KWT. If LWA-ID is not found, the WT sends EAP-Failure message, terminating the WLAN association (S4120).

WT initiates EAP-LWA, by sending AAA EAP-Request/LWA-Challenge message, by including a 128-bit random nonce, ASNonce (S4130).

AP forwards the EAP-Request/LWA-Challenge message to the UE (S4140).

UE selects a 128-bit random nonce, STANonce, and derives AUTHRES and MSK as follows (S4150):

AUTHRES=SHA256 (S-KWT, ASNonce, STANonce, "LWA AUTHRES");

MSK=SHA256 (S-KWT, ASNonce, STANonce, "LWA MSK Key Derivation").

UE sends EAP-Response/LWA-Challenge message with STANonce and AUTHRES (S4160).

WLAN AP forwards the EAP-Response/LWA-Challenge AAA message to WT (S4170).

WT derives AUTHRES and MSK as specified in step S4150 and compares it with the received AUTHRES (S15180). If they are same, EAP-LWA authentication is successful, and proceeds to step S4190. Otherwise EAP-Failure message is sent, terminating WLAN association procedure.

WT sends EAP-Success with MSK as AAA message to WLAN AP (S4190).

WLAN AP sends EAP-Success (S4200).

Upon receiving EAP-Success, the UE and WLAN AP perform 4-way handshake and complete WLAN association (S4210).

WT sends WT Association Confirm message to the eNB, confirming successful WLAN association of the UE. Note that WT may send this message anytime after step S15190 (S4220).

As discussed above, in order to perform the LWA operation, the UE should perform association and authentication with respect to the WLAN, and cannot receive data through the WLAN until a corresponding result is delivered from the WT to the eNB.

In general, authentication for WLAN access is performed each time the UE is de-associated from the AP after having been associated with the corresponding AP (when an explicit de-association request is received from the UE). According to a configuration, in cases where the UE associated with the AP moves out of coverage of the AP so as to be de-associated, the AP may store context of the corresponding UE for a predetermined period of time, but when the predetermined period of time expires, the AP deletes the context of the corresponding UE, and thus, when the UE associates with the corresponding AP again, the UE should perform the authentication procedure again.

That is, in order to perform WLAN, the UE should separately perform authentication for LTE access and authentication for WLAN access.

This, however, causes overhead for signaling transmission, as well as increasing delay for security association between the UE and the network, as discussed above.

In order to solve the problem, a method allowing a UE to access another network without a separate re-authentication procedure, if the UE is once authenticated through an initial network access procedure with respect to a network is required.

Thus, since a next-generation communication system may be designed to support a plurality of accessible networks, this disclosure provides a method for generating a common key which can be commonly used to access every network before a base key for accessing a specific network is generated, for the purpose of efficiency of security key management.

Also, since a plurality of network techniques are connected to the 5G core network, this disclosure proposes a method for providing rapid security association to a UE without separate re-authentication although the UE is connected to the core network through another network, if an authentication procedure is once completed by the same authentication entity (e.g., a network having an authentication server function (AUSF), etc.) through a specific network supported by the core network, thus minimizing delay required for providing a service.

In detail, this disclosure proposes methods for optimizing a multi-RAT security operation, when the core network supports multi-RAT in a 5G wireless communication environment.

That is, unlike a 4G EPC based upon the premise of a single access network (E-UTRAN), the 5G core network may accommodate a plurality of access networks, and thus, a method for effectively generating and managing security context information regarding UEs which use different access techniques is anticipated to be required in order to optimize security association setup regarding UEs.

Also, since security procedures, security key generation procedures, and security key types are different according to each RAT, every RAT cannot generate a security procedure and a security key through a generated common key.

Thus, a base key corresponding to each RAT should be generated through the generated common key.

To this end, the present disclosure proposes a method for generating a common key generation-based base key which can be commonly used in multi-RAT.

Also, since the 5G system is required to be designed to minimize delay based on signaling including security required before transmission of user data, the present disclosure proposes a method for updating a security key based on a multi-RAT common key for non-3GPP access when 3GPP and non-3GPP accesses interwork with each other (e.g., handover, LTE-WLAN aggregation).

FIG. 5 is a flow chart illustrating an example of a method for generating a common key which may be used in multiple networks in an initial network access procedure proposed in this disclosure.

Referring to FIG. 5, in an initial network access procedure, a UE and a core network (e.g., a C-CPF), while performing mutual authentication, may generate a common key commonly used in a multi-RAT and generate a base key corresponding to each RAT through the generated common key.

In detail, the UE transmits an access request message including a UE identifier, (e.g., an IMSI, etc.) for identifying the UE to a first RAN node (e.g., new RAT) in order to access a specific network.

The first RAN node delivers the access request message received from the UE to a mobility management (MM) function of a common control plane function (C-CPF) through a slice selection function (SSF) (S5010).

Upon receiving the connection request message, an MM function determines through which access type of RAN node the access request message has been transmitted.

The MM function delivers a determination result to an authentication server function (AUSF) so that the AUSF may perform mutual authentication with the UE.

Upon checking an access type of the network that the UE has accessed, from the MM function, the AUSF transmits an authentication information request message requesting authentication information regarding the UE to an authentication repository processing function (ARPF) in order to perform mutual authentication with the UE (S5020).

The authentication information request message includes access network information indicating a network through which the UE has accessed the core network. That is, the access network information indicates a type (e.g., new RAT, eLTE, non-3GPP (WLAN or the like), etc.) of a network which the UE has attempted to access.

Since the 5G core network is required to accommodate various networks (e.g., new RAT, eLTE, non-3GPP access (e.g., WLAN), etc.), the MM function includes access network information in an authentication information request message and transmits the same in order to generate a base key corresponding to each network, after generation of a common key.

That is, in order to generate a base key, first, a common key commonly used in multi-RAT is required to be generated, and an authentication vector including the base key generated on the basis of the generated common key and the common key are delivered to the AUSF for the purpose of effective multi-RAT interworking afterwards.

The ARPF generates the authentication vector and delivers an authentication information response message including the generated authentication vector, identification information of a network slice to which the UE has subscribed, and the common key to the AUSF (S5030, S5040).

That is, the ARPF generates a common key for generating a base key included in the authentication vector, and generates a base key corresponding to the access network information through the common key.

The common key and the base key may be stored in a security anchor function (SEAF) (or security context management function (SCMF) and maintained, and may be generated through a predetermined key delivery function (KDF) as expressed by Equation 1 and Equation 2.

$$\text{Common Key} = KDF(CK, IK, SQN \oplus AK, \text{"Common Key"}) \quad [\text{Equation 1}]$$

$$\text{Base Key} = KDF(\text{Common Key}, SN\_ID, \text{Network Code}), \quad [\text{Equation 2}]$$

In Equation 2, the network code may refer to information regarding access combination of "New RAT, NextGen", "eLTE, NextGen" defined according to a network type identified from the access network information received by the ARPF from the AUSF.

The network code may be predefined by an operator or may be generated through Equation 3 below.

$$\text{Network code} = F(K, RAND, \text{"Access,Core" access combination}), \quad [\text{Equation 3}]$$

In Equation 3, F denotes a function for generating a network code.

The AUSF performs a mutual authentication procedure with the UE through the authentication vector received from the ARPF (S5050).

Here, the AUSF transmits a network code to the UE through a mutual authentication procedure such that the UE may generate a base key.

That is, the AUSF may transmit an authentication request message including a network code to the UE for mutual authentication with the UE, and receive an authentication response message as a response thereto.

For example, in cases where the UE accesses an NG core through eLTE access, the UE cannot know whether the UE itself has accessed the NG core through an EPC connected to the eLTE access or through the eLTE access, and thus, the AUSF transmits a network code to the UE so that the UE may generate a base key.

As discussed above, since the 4G EPC considers the E-UTRAN as a basic access network and is not designed to accommodate a plurality of RATs, it is not necessary to inform the UE about the network code.

However, in cases where the core network accommodates a multi-RAT such as new RAT, eLTE, WLAN, and the like, a network code may be transmitted to the UE so that the UE may generate a base key according to a network type.

The UE generates a common key and a base key on the basis of the authentication vector, the network code, and the like, received from the AUSF in the same manner as that of the ARPF (S5060).

The generated common key is safely stored in a USIM, or the like, so as to be used when the UE accesses another network later.

When mutual authentication between the AUSF and the UE is completed, the MM function transmits a network connection accept message to the first RAN node in order to inform the UE about acceptance of network connection, and the first RAN node transmits a network connection accept message to the UE (S5070).

The UE and the SEAF generate a seed key to be used in a network using the base key (S5080).

For example, the UE and the SEAF may generate a seed key by inputting the base key, an ID of an NSI, and the like, to a predetermined key delivery function (KDF) as expressed by Equation 4 below.

$$\text{Seed Key} = KDF(\text{Base Key}, \text{NSI ID}, \text{etc}) \quad [\text{Equation 4}]$$

The UE may perform an access procedure with a specific network slice (first network slice, which will be referred to as a "first NSI" hereinafter) to establish a session, and may verify the seed key generated by the UE with the network slice through the access procedure.

In order to perform the access procedure with the first NSI, the UE transmits a setup request message to the first RAN node, and the first RAN node transmits the received setup request message to the C-CPF (S5090).

The setup request message may include an NSI identifier for identifying the first NSI, security capability information of the UE, a hash value of the seed key generated by the UE, and the like.

Upon receiving the setup request message from the UE, the C-CPF additionally includes an RAN node ID for identifying the first RAN node which the UE has accessed and the seed key in the setup request message, and transmits the corresponding setup request message to the first NSI (S5100).

The first NSI may generate a RAN node key using the RAN node ID and the seed key included in the setup request message received from the C-CPF.

The first NSI transmits the seed key and a setup response message to the C-CPF, and the C-CPF transmits the received seed key and the setup response message to the first RAN node (S5110, S5120).

The setup response message includes security feature information for generating a key to be used by the UE and the first RAN node in a wireless section.

The security feature information, security-related information determined to be applied to the UE by the first NSI on the basis of the security capability information of the UE transmitted by the UE through the setup request message, refers to security features to be applied to the UE in order to provide a service of the NSI to the specific UE.

The security feature information may include security algorithm information, security key size information, and the like.

The security algorithm information may include an encryption algorithm ID indicating an encryption algorithm for generating an encryption key by the first RAN node and the UE and an integrity algorithm ID indicating an integrity algorithm for generating an integrity key.

In cases where the first NSI generates a RAN node key, the first NSI may transmit a RAN node key, instead of a seed key, in step S5110 and step S5120.

The first RAN node may generate a RAN node key using the seed key, the RAN node ID, and the like, and generates a signaling encryption key (RRC-Enc Key), an integrity key (RRC-Int Key), a user plane (UP) encryption key (UP-Enc Key), and the like, which may be used in a wireless section through the generated RAN node key (S5130).

For example, the first RAN node may generate the RAN node key, the signaling encryption key, the integrity key, and the UP encryption key through a predetermined key delivery function (KDF) as expressed by Equation 5 below.

RAN Node Key=KDF(Seed Key,Ran Node ID,etc)  [Equation 5]

RRC-Enc Key=KDF(RAN Node Key, Encryption Algorithm ID, etc)

RRC-Int Key=KDF(RAN Node Key, Integrity Algorithm ID, etc)

UP-Enc Key=KDF(RAN Node Key, Encryption Algorithm ID, etc)

The first RAN node transmits information included in the setup response message received from the first NSI and a setup indicator to the UE, and here, the setup indicator includes identification information of the first NSI to which security setup is to be applied (S5140).

Here, the setup response message includes AS security feature information to be applied between the UE and the RAN node with respect to the first NSI, and the security feature information includes information such as signaling encryption/integrity protection algorithm, data encryption algorithm, and the like, to be used in an AS section.

Upon receiving the AS security mode setup indicator and the session response from the RAN node, the UE first generates a RAN node key using the seed key generated by the UE itself, the RAN node ID, and the like (S5150).

Here, the UE may generate the RAN node key through a method as expressed by Equation 5 above.

Thereafter, the UE identifies a slice to which security setup received through the session response message is to be applied, through an ID of the first NSI included in the AS security mode setup indicator.

That is, the UE recognizes information regarding the signaling encryption/integrity protection algorithm or data encryption algorithm to be applied to the AS security mode setup with respect to the slice identifier received from the RAN node, and subsequently generates a signaling encryption key, an integrity key, a UP encryption key, and the like, to be used in a wireless section therethrough.

Here, the UE may generate the signaling encryption key, the integrity key, and the UP encryption key through the method as expressed by Equation 5 above.

The UE transfers Security Mode Complete including identification information of the first NSI to the first RAN node in order to inform that the AS security setup with respect to the first NSI has been completed (S5160).

In this manner, the UE may generate a common key for authentication for an initial network access, and after the generation of the common key, the UE may access another network without a separate UE re-authentication procedure.

FIG. 6 is a flow chart illustrating an example of a method for performing a handover procedure through a generated common key proposed in this disclosure.

Referring to FIG. 6, in cases where the UE which has accessed the core network through a specific network performs handover to another network, the UE may update a security key through a common key updating procedure.

Hereinafter, it is assumed that a network to which the UE performs handover is WLAN.

In detail, the UE detects a second network (hereinafter, referred to as "WLAN") according to a preset measurement configuration and determines handover to the WLAN (S6010).

The UE transmits a connection setup request message for accessing the WLAN to a second RAN node (S6020).

The connection request message includes a temporary identifier (e.g., a temporary UE ID) of a UE obtained by the UE from the MM function through network connection, a connection request type indicating a connection request message for performing handover based on a change in network (e.g., from 3GPP access to non-3GPP access), a source RAN node ID indicating an existing RAN node (first RAN node), NSI identification information for identifying an NSI providing a service to the U E before handover, and the like.

The second RAN node transmits the access request message received from the UE to the MM function of the C-CPF (S6020).

The MM function identifies the UE through a temporary identifier, and may recognize that the UE has transmitted the access request message to perform handover based on a change in network.

Accordingly, the MM function may recognize that the UE was authenticated through an authentication procedure when initially accessing a network previously.

Thus, the MM function enables the SEAF (or SCMF) to generate a base key to be used in WLAN through a common key retained after being received from the ARPF during a process of authenticating the UE previously, without re-authenticating the UE (S6030).

To this end, as discussed above with reference to FIG. 5, the SEAF (or SCMF) is required to have stored information (UE ID, security context obtained when the UE was authenticated (common key, etc.)) regarding authenticated UEs.

The UE generates a base key to be used in WLAN through a common key stored in the UE in the same manner as that of the SEAF (or the SCMF) (S6040).

Here, the UE and the SEAF (or SCMF) may generate the base key from the common key through a method disclosed in WLAN specification.

The MM function may receive the base key from the SEAF (or SCMF).

The MM function may generate a seed key for WLAN access to the UE and transmits a connection setup response message including an indicator indicating that the generated seed key is required to be mutually verified with the SEAF (or SCMF) (S6050).

The UE and the SEAF (or SCMF) generate a seed key to be used in the WLAN using the base key and a network slice ID (S6060, S6070).

The UE and the SEAF (or SCMF) starts a session path updating procedure to verify whether the generated seed keys are valid, respectively.

The session path updating procedure is a procedure for informing a corresponding network slice that backhaul connection should be established in cases where there is no connection between the WLAN and the NSI or that a service delivery path should be changed from a specific network to the WLAN in cases where there is a connection between the WLAN and the NSI, when a UE, which has accessed a specific network so as to be connected to a specific NSI to receive a service, performs handover to WLAN access.

In order to perform the session path updating procedure, the UE transmits a session updating request message requesting session updating to the second RAN node, and the second RAN node transmits the session updating request message transmitted from the UE to the C-CPF (S6080).

The session updating request message may include a temporary identifier (e.g., a temporary UE ID) allocated to the UE, an indicator indicating verification regarding a generated seed key, security capability information of the UE, a hash value regarding a seed key generated by the UE, and the like.

Upon receiving the session updating request message from the second RAN node, the C-CPF identifies a network slice-specific temporary UE ID corresponding to the temporary identifier of the UE.

Thereafter, the C-CPF transmits a session updating request message including information such as the network slice-specific temporary UE ID, a RAN node ID (AP identifier, AP address, etc.) regarding the WLAN, the seed key, and the like, to the first NSI (S6090).

The first NSI transmits a session update response message including security feature information and a hash value regarding a seed key generated by the first NSI to the C-CPF through the second RAN node (S6100).

Upon receiving the session update response message from the first NSI, the C-CPF adds a seed key to the session update response message, and transmits the same to the second RAN node (S6110).

Here, as for the security feature information, security algorithms supported by the UE and the RAN node may be different according to a connected network although the NSI is the same, and this is because security feature information is required for generating a wireless section key between the UE and the second RAN node.

As discussed above, the security feature information refers to security features to be applied to the UE to provide a service of the NSI to the UE, and may include security algorithm information, security key size information, and the like.

The security feature information refers to security-related information determined by the first NSI to be applied to the UE on the basis of security capability information of the UE regarding the WLAN transmitted by the UE through the session update request message.

Upon receiving the session update response message from the C-CPF, the second RAN node stores the seed key to generate a wireless section key, and transmits a session update response message including the security feature information, information regarding the hash value regarding the seed key generated by the first NSI, and the like, to the UE (S6110).

The UE and the second RAN node generate a RAN node key to be used in a wireless section through information such as the mutually verification-completed seed key, the second RAN node ID, and the like (S6120 and S6130).

In this manner, although a network is changed through handover, the UE may access a new network without a re-authentication procedure, and since the UE accesses the new network without a re-authentication procedure, delay for security association between the UE and the network and overhead for signaling transmission may be reduced.

FIG. 7 is a flow chart illustrating an example of a method for performing an LWA operation through a generated common key proposed in this disclosure.

Referring to FIG. 7, in a situation in which the UE which has accessed the core network is provided with a service through a specific network slice, when the UE additionally accesses another network connected to the core network to receive a service, the UE may access the other network without re-authentication.

Hereinafter, a case in which an LWA operation is performed through the WLAN will be described as an example, and here, the second RAN node may refer to a WT of the WLAN.

In detail, the UE detects the WLAN according to a preset measurement configuration and transmits with a measurement report and a hash value (e.g., a message authentication code) regarding a common key which has been obtained and stored through an authentication procedure performed to initially access a network, to the second RAN node to access the WLAN (S7010).

The second RAN node receives the measurement report and the hash value regarding a common key from the UE, and transmits an access request message to the C-CPF to perform an LWA operation without re-authentication to a WLAN AP detected by the UE (S7020).

The access request message includes a temporary identifier (e.g., a temporary UE ID) obtained from the MM function when the UE initially accessed a network, a RAN node ID for identifying the second RAN node detected by the UE, NSI identification information for identifying an NSI from which the UE has been provided with a service, and a hash value regarding a common key transmitted by the UE together with the measurement report.

The MM function may identify the UE through the temporary identifier and enables the SEAF (or SCMF) to verify a common key obtained when performing a mutual authentication procedure with the UE when the UE initially accessed the network previously (S7030).

To this end, the SEAF (or the SCMF) stores information (UE ID, security context (common key, etc.) used for authenticating the UE) regarding the authenticated UEs, and compares the hash value regarding the common key transmitted from the UE with the hash value regarding the common key stored in the SEAF (or the SCMF) to determine whether the corresponding UE is an already authenticated UE).

That is, when the hash value transmitted from the UE and the hash value regarding the common key stored in the SEAF are the same, the SEAF determines that the UE is an authenticated UE and does not perform a re-authentication procedure. However, when the hash value transmitted from the UE and the hash value regarding the common key stored in the SEAF are not the same, the SEAF determines that the UE is not an authenticated UE and performs the aforementioned mutual authentication procedure.

Thereafter, the SAF (or the SCMF) instructs the MM function to transmit an access response message to the first RAN node in order to inform the UE whether the UE can access the WLAN without re-authentication (S7040).

The access response message includes an indicator indicating acceptance/rejection of WLAN access without re-authentication with respect to the UE and a temporary identifier (e.g., a temporary UE ID) of the UE.

The first RAN node generates $S\text{-}K_{WT}$ according to a method defined in the 4G system (S7050).

When a UE which can be identified by a temporary identifier accesses the WLAN, since the UE is an already authenticated UE, the first RAN node transmits an additional request message including the temporary identifier of the UE, $S\text{-}K_{WT}$, and an authentication identifier indicating that an LWA operation will be performed through common key verification by the C-CPF to the second RAN node in order to provide a service without re-authentication (S7060).

The second RAN node transmits an acknowledge regarding the additional request message to the first RAN node (S7070).

The first RAN node transmits an RRC connection reconfiguration including WT Counter indicating a counter value for generating a security key with the second RAN node and an authentication identifier indicating that an LWA operation will be performed through common key verification by the C-CPF, to the UE (S7080).

The authentication identifier indicates that the UE is a UE which has been authenticated through a verification procedure based on the common key.

Through the RRC connection reconfiguration message, the first RAN node may inform the UE that the UE may be able to access the WLAN without re-authentication when accessing the WLAN AP by applying a configuration for an LWA operation.

The UE may transmit an RRC Connection Reconfiguration Complete message to the first RAN node to inform the RAN node that a configuration for performing an LWA operation has been completed (S7090).

The UE performs WLAN association to use an LWA configuration (S7100).

The second RAN node may identify the UE as a UE able to perform an LWA operation without a re-authentication procedure, and immediately transmit an access result to the first RAN node without an authentication procedure.

In this manner, in cases where the UE performs a mutual authentication procedure with the core network in initially accessing a network, the UE may access another network without an additional re-authentication procedure to receive a service.

For example, in the case of the related art 4G system, in order for a UE to access the WLAN for an LWA operation, the UE cannot be provided with a service through the WLAN until a WT does not inform the RAN node about a result of association and authentication after the UE performs the association and authentication. However, in the present invention, when the UE performs an authentication procedure in initially accessing a network, the UE does not need to perform an additional re-authentication procedure in an access procedure of the WLAN for the LWA operation later.

Thus, a time required for authentication for WLAN association in performing the LWA operation may be reduced.

FIG. 8 is a flow chart illustrating an example of a method for generating a common key which may be used in multiple networks by a terminal in an initial network access procedure proposed in this disclosure.

Referring to FIG. 8, when a UE wants to initially access a core network through a first network included in the core network, the UE transmits a first access request message for accessing the first network of the core network to the first RAN node (S8010).

Here, the first access request message may include the same information as that of the connection request message described above with reference to FIG. 16.

Thereafter, the UE performs an authentication procedure for mutual authentication described above with reference to FIG. 16 with a node performing an authentication server function (AUSF) of the core network (S8020).

The UE generates a common key commonly used in one or more networks included in the core network on the basis of an authentication vector obtained through the authentication procedure (S8030).

Here, the common key may be generated through the method described above with reference to FIG. 5.

Thereafter, the UE generates a first base key of the first network on the basis of the common key and a network code corresponding to a type of the first network (S8040).

The first base key refers to a key as a basis for generating a seed key for generating a key for encryption and integrity of signaling and an encryption key of data in the first network.

The network code may refer to information regarding "New RAT, NextGen", "eLTE, NextGen" access combination defined according to a type of a network identified from access network information received by the ARPF from the AUSF described above with reference to FIG. 16.

When the authentication procedure for mutual authentication of the UE is completed, the UE receives an access accept message indicating an access accept of the first network from the first RAN node (S8050).

FIG. 9 is an internal block diagram of a wireless device to which the present invention may be applied.

Here, the wireless device may be an eNB or a UE, and the eNB includes both a macro eNB and a small eNB.

As illustrated in FIG. 9, the eNB 910 and the UE 920 include communication units (transceiver units or RF units 913 and 923), processors 911 and 921, and memories 912 and 922, respectively.

In addition, the eNB and the UE may further include an input unit and an output unit.

The communication units 913 and 923, the processors 911 and 921, the input unit, the output unit, the memories 912 and 922 are functionally connected to perform a method proposed in this disclosure.

When information created from a physical layer (PHY) protocol is received, the communication units (transceiver units or RF units 913 and 923) move the received information to a radio-frequency (RF) spectrum, perform filtering, amplification, and the like, and transmit corresponding information to an antenna. Also, the communication units 913 and 923 serve to move an RF signal received by the antenna to a band in which the RF signal can be processed in the PHY protocol, and perform filtering thereon.

Also, the communication units 913 and 923 may have a switch function for switching transmission and reception functions.

The processors 911 and 921 implement functions, processes and/or methods proposed in this disclosure. Layers of a radio interface protocol may be implemented by the processors 911 and 921.

The processors 911 and 921 may also be expressed by a controller, a control unit, a computer, and the like.

The memories 912 and 922 are connected to the processors 911 and 921 to store a protocol or a parameter for performing an uplink resource allocation method, respectively.

The processors 911 and 921 may include an application-specific integrated circuit (ASIC), another chip set, a logic circuit and/or data processing device. The memories 912 and 922 may include a read-only memory (ROM), a random access memory (RAM), a flash memory, a memory card, a storage medium and/or any other storage device. The communication units 913 and 923 may include a baseband circuit for processing a wireless signal. When an embodiment is implemented by software, the aforementioned techniques may be implemented by a module (process, function, etc.) performing the aforementioned functions.

The module may be stored in the memory 912 or 922 and executed by the processor 911 or 921. The memory 912 or 922 may be present within or outside the processor 911 or 921 mad may be connected to the processor 911 or 921 through a well-known unit.

The output unit (display unit) is controlled by the processor 911 or 921, and outputs information output from the processor 911 or 921, together with a key input signal generated by a key input unit and various type information signals from the processor 911 or 921.

Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

As for the method and apparatus for authenticating a terminal between heterogeneous networks in a wireless communication system according to the present disclosure, the configuration and method according to the embodiments of the present disclosure described above are not limited in its application, but the entirety or a portion of the embodiments may be selectively combined to be configured into various modifications.

In the embodiments of the present invention, the method for transmitting and receiving data according to the present disclosure may be implemented as codes that can be read by a processor provided in a network device in a recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific exemplary embodiments have been described. However, the present disclosure is not limited to the specific exemplary embodiments and various modifications may be made without departing from the scope of the present invention claimed in the claims, and such modifications should not be individually understood from technical concepts or prospects of the present disclosure.

Further, although the disclosure has described both product inventions and process inventions, description of both inventions may be complementarily applied as needed.

In the wireless communication system of this disclosure, an example of the method and apparatus for authenticating a terminal between heterogeneous networks in a wireless communication system applied to a 3GPP LTE/LTE-A system has been described, but the method and apparatus for authenticating a terminal between heterogeneous networks in a wireless communication system may also be applied to various other wireless communication systems, as well as to the 3GPP LTE/LTE-A system.

What is claimed is:

1. A method for performing a security procedure by a terminal in a wireless communication system, the method comprising:
   transmitting a first access request message for accessing a core network supporting a plurality of radio access technology (RAT) types to a first radio access network (RAN) node using a first RAT type of the plurality of RAT types,
   wherein the first access request message including a terminal identifier for identifying the terminal;
   performing an authentication procedure for mutual authentication with a node performing an authentication server function (AUSF) of the core network;
   receiving, from the node performing the AUSF, a network code related to a RAT type used for accessing the core network by the terminal, through the authentication procedure,
   wherein the network code is generated based on a specific function for generating the network code;
   generating a common key based on an authentication vector obtained through the authentication procedure,
   wherein the common key is commonly used for generating base keys for each of a plurality of RAN nodes regardless of RAT types used by the plurality of RAN nodes, and
   wherein the base keys vary based on the plurality of RAT types;
   generating a first base key for the first RAN node based on the common key and the network code received through the authentication procedure;
   storing the common key for a handover to a second RAN node using a second RAT type different from the first RAT type or for an aggregation of the first RAN node and the second RAN node,
   wherein, based on the stored common key, a second base key for the second RAT type is generated without a re-authentication procedure related to the second RAN node when the handover and the aggregation are performed; and
   receiving an access accept message indicating an access accept of the core network from the first RAN node;
   generating a first seed key for generating a first security key used in a first radio section between the first RAN node and the terminal based on the first base key;
   transmitting to the first RAN node a session establishment request message requesting a session setup of a first network included in the core network,
   wherein the session establishment request message includes the first seed key and security capability information of the terminal; and
   receiving a security mode setup response message in response to the session establishment request message,
   wherein the security mode setup response message includes security setup information related to security to be applied to the terminal by the first network based on the security capability information and a first network identifier for identifying the first network.

2. The method of claim 1, wherein the authentication procedure comprises:
   receiving, from the node performing the AUSF, an authentication request message including the authentication vector and the network code; and
   transmitting an authentication response message in response to the authentication request message.

3. The method of claim 1, wherein the core network includes a plurality of network slice instance (NSI)s indicating a network virtualized to provide a specific service.

4. The method of claim 1, wherein the security setup information includes an encryption/integrity algorithm for encryption and integrity protection of signaling and encryption algorithms for encryption of data.

5. The method of claim 1, further comprising:
   generating a RAN node key used in the first radio section between the first RAN node and the terminal based on the first seed key and a first RAN node identifier for identifying the first RAN node.

6. The method of claim 4, further comprising:
identifying the first network based on the first network identifier;
setting security of the identified first network based on the security setup information; and
transmitting a security mode complete message indicating that security setting for the first network is completed, to the first RAN node.

7. The method of claim 6, wherein the setting of the security comprises:
generating a signaling encryption key and a signaling integrity key based on the encryption/integrity algorithm and a user plane encryption key based on the encryption algorithm for encryption of data.

8. The method of claim 1, further comprising:
transmitting a second access request message requesting an access to the core network, to the second RAN node;
generating the second base key for the second RAN node based on the common key;
generating a second seed key for generating a second security key used in a second radio section between the terminal and the second RAN node based on the second base key and a second network identifier for identifying a second network included in the core network;
performing a session path updating procedure for verifying validity of the second seed key with a security anchor function included in the core network or a security context management function included in the core network; and
generating a second RAN node key for generating the second security key used in the second radio section based on the second seed key and a second RAN node identifier for identifying the second RAN node.

9. The method of claim 8, wherein the second access request message includes at least one of the terminal identifier, request type information indicating a request for handover from the first RAN node to the second RAN node, a RAN node identifier for identifying the first RAN node, or a network identifier for identifying the second network.

10. The method of claim 8, wherein the session path updating procedure comprises:
transmitting a session path update request message to the second RAN node; and
receiving a session path update response message in response to the session path update request message,
wherein the session path update request message includes at least one of the terminal identifier, an indicator indicating a request for verification of the second seed key, the security capability information of the terminal, or a first hash value corresponding to the second seed key, and
wherein the session path response message includes at least one of security feature information of the first network, a second hash value corresponding to a seed key generated by the first network or seed key information for the seed key generated by the first network.

11. The method of claim 10, wherein the security feature information is generated based on the security capability information of the terminal.

12. The method of claim 1, further comprising:
transmitting a measurement report message including a measurement value of the second RAN node and a hash value of the common key to the first RAN node;
receiving a connection reconfiguration message for providing a service based on the aggregation of the first RAN node and the second RAN node from the first RAN node;
transmitting a connection reconfiguration complete message to the first RAN node in response to the connection reconfiguration message; and
providing a specific service through the aggregation of the first RAN node and the second RAN node without a terminal authentication procedure in the second network based on the common key.

13. The method of claim 12, wherein the connection reconfiguration message includes an authentication identifier indicating that the terminal is a User Equipment (UE) authenticated through a verification procedure based on the common key.

14. The method of claim 1,
wherein a security anchor function included in the core network or a security context management function included in the core network stores information related to the authenticated terminal for the handover and the aggregation performed without the authentication procedure, and
wherein the information stored in the core network includes the common key and the terminal identifier identifying the terminal.

15. The method of claim 12,
wherein a security anchor function included in the core network or a security context management function included in the core network compares a first hash value of the common key transmitted from the terminal with a second hash value of the common key stored in the security anchor function or the security context management function, and
wherein the security anchor function or the security context management function determines whether the terminal is authenticated based on the comparison of the first hash with the second hash.

16. A terminal for performing a security procedure in a wireless communication system, the terminal comprising:
a transceiver transmitting and receiving a wireless signal; and
a processor functionally coupled to the transceiver, wherein the processor is configured to:
transmit a first access request message for accessing a core network supporting a plurality of radio access technology (RAT) types to a first radio access network (RAN) node using a first RAT type of the plurality of RAT types,
wherein the first access request message including a terminal identifier for identifying the terminal,
perform an authentication procedure for mutual authentication with a node performing an authentication server function (AUSF) of the core network,
receive, from the node performing the AUSF, a network code related to a RAT type used for accessing the core network by the terminal, through the authentication procedure,
wherein the network code is generated based on a specific function for generating the network code,
generate a common key based on an authentication vector obtained through the authentication procedure,
wherein the common key is commonly used for generating base keys for each of a plurality of RAN nodes regardless of a RAT type used by the plurality of RAN nodes, and
wherein the base keys vary based on the plurality of RAT types;

generate a first base key for the first RAN node based on the common key and the network code received through the authentication procedure;

store the common key for a handover to a second RAN node using a second RAT type different from the first RAT type or for an aggregation of the first RAN node and the second RAN node, wherein, based on the stored common key, a second base key for the second RAT type is generated without a re-authentication procedure related to the second RAN node when the handover and the aggregation are performed; and receive an access accept message indicating an access accept of the core network from the first RAN node, generate a first seed key for generating a first security key used in a first radio section between the first RAN node and the terminal based on the first base key;

transmit to the first RAN node a session establishment request message requesting a session setup of a first network included in the core network, wherein the session establishment request message includes the first seed key and security capability information of the terminal; and receive a security mode setup response message in response to the session establishment request message, wherein the security mode setup response message includes security setup information related to security to be applied to the terminal by the first network based on the security capability information and a first network identifier for identifying the first network.

* * * * *